(12) United States Patent
Xu

(10) Patent No.: US 11,706,030 B2
(45) Date of Patent: Jul. 18, 2023

(54) AUTHORIZATION METHOD AND AUTHORIZATION SYSTEM DISPLAYING AUTHORIZATION INFORMATION ON E-PAPER

(71) Applicant: VIA Technologies, Inc., New Taipei (TW)

(72) Inventor: Yaozhong Xu, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 184 days.

(21) Appl. No.: 16/944,166

(22) Filed: Jul. 31, 2020

(65) Prior Publication Data

US 2021/0320800 A1 Oct. 14, 2021

(30) Foreign Application Priority Data

Apr. 14, 2020 (CN) .......................... 202010291921.3

(51) Int. Cl.
| | |
|---|---|
| H04L 9/32 | (2006.01) |
| G02F 1/167 | (2019.01) |
| G06F 21/36 | (2013.01) |
| H04L 9/06 | (2006.01) |

(52) U.S. Cl.
CPC ............ H04L 9/3228 (2013.01); G02F 1/167 (2013.01); G06F 21/36 (2013.01); H04L 9/0656 (2013.01); H04L 9/3234 (2013.01); H04L 9/3268 (2013.01)

(58) Field of Classification Search
CPC ... H04L 9/3228; H04L 9/0656; H04L 9/3234; H04L 9/3268; G02F 1/167; G06F 21/36

USPC .......................................................... 713/179
See application file for complete search history.

(56) References Cited

U.S. PATENT DOCUMENTS

| | | | |
|---|---|---|---|
| 9,418,326 B1 | 8/2016 | Narayanaswami | |
| 2004/0162890 A1* | 8/2004 | Ohta ....................... | G06F 9/453 715/705 |
| 2006/0161977 A1* | 7/2006 | Jung ..................... | H04L 9/3226 726/21 |
| 2007/0283248 A1* | 12/2007 | Yoshida .................. | G09F 9/372 715/273 |
| 2011/0066852 A1* | 3/2011 | Takeda ................ | G06F 21/6218 713/168 |
| 2013/0168444 A1* | 7/2013 | Hsieh ........................ | G06F 3/14 235/375 |

(Continued)

FOREIGN PATENT DOCUMENTS

| | | |
|---|---|---|
| CN | 107103255 | 8/2017 |
| CN | 109615038 | 4/2019 |

(Continued)

OTHER PUBLICATIONS

"Office Action of Taiwan Counterpart Application," dated Dec. 9, 2020, p. 1-p. 19.

*Primary Examiner* — Bryan F Wright
(74) *Attorney, Agent, or Firm* — JCIPRNET

(57) ABSTRACT

An authorization method and an authorization system are provided. The authorization method includes displaying, by a service device, authorization information on an e-paper arranged on the service device; obtaining, by a user device, the authorization information from the e-paper; and using, by the user device, the authorization information displayed on the e-paper to perform an authorization operation between the user device and the service device.

32 Claims, 5 Drawing Sheets

(56) References Cited

U.S. PATENT DOCUMENTS

2016/0294821 A1    10/2016  Neuman et al.
2018/0165900 A1*    6/2018  Xu ........................... G07C 9/00
2020/0092272 A1     3/2020  Eisen et al.

FOREIGN PATENT DOCUMENTS

| JP | 2006017906 | 1/2006 |
| JP | 2009152774 | 7/2009 |
| TW | I460662 | 11/2014 |
| TW | M584934 | 10/2019 |
| WO | 2019087812 | 5/2019 |

* cited by examiner

AUTHORIZATION METHOD AND AUTHORIZATION SYSTEM DISPLAYING AUTHORIZATION INFORMATION ON E-PAPER

CROSS-REFERENCE TO RELATED APPLICATION

This application claims the priority benefit of China application no. 202010291921.3, filed on Apr. 14, 2020. The entirety of the above-mentioned patent application is hereby incorporated by reference herein and made a part of this specification.

BACKGROUND

Technical Field

The disclosure relates to a method and system, and more particularly to an authorization method and an authorization system.

Description of Relevant Art

The factory setting of conventional wireless network equipment (service device) uses a fixed initial user name and a fixed initial password. The user device may log in to the service device using the initial user name and the initial password to set/control the service device. The initial user name and the initial password are recorded somewhere, such as on a sticker affixed to the equipment, and/or on the manual of the equipment. Most users do not change the initial user name and the initial password, so it is easy for hackers to guess (or obtain) the initial user name and the initial password of the conventional wireless network equipment. Even if the user changes the user name and the password, most people choose user names and passwords which are easy to remember (and even use the same passwords for multiple equipment), and the passwords are not frequently updated. Therefore, the safety factor of the conventional wireless network equipment is low (i.e., the conventional wireless network equipment is vulnerable to being hacked).

In addition, in the traditional authorization system, the user device and the service device must use the same communication network to transfer (or exchange) the public key and perform the authorization operation. When the public key is transferred (or exchanged), an illegal device may intercept the true public key from the communication network (electrical network, such as the Internet) and replace the true public key with a fake public key. Therefore, the traditional authorization system may have information security issues.

For another example, when the service device provides authorization information including a password to the user device through the network, the authorization information may be stolen by a third party through a network packet, causing the password to be leaked. Alternatively, when the user device intends to connect to the authorization page to perform authorization, the user device may be linked to a wrong phishing website, causing the password to be leaked. Also, alternatively, data such as the account and the password are stored in the service device, so the password will be leaked when the service device is hacked. Therefore, the traditional authorization method and authorization system have information security risks.

SUMMARY

The disclosure provides an authorization method and an authorization system, which can improve information security.

The authorization method according to the disclosure includes the following steps. Authorization information is displayed by a service device on an e-paper arranged on the service device. The authorization information is obtained by a user device from the e-paper. The authorization information displayed on the e-paper is used by the user device to perform an authorization operation between the user device and the service device.

The authorization system according to the disclosure includes a service device and a user device. The service device includes an e-paper and a processor, wherein the processor is configured to control the e-paper to display authorization information on the e-paper. The user device is configured to obtain the authorization information from the e-paper and to use the authorization information displayed on the e-paper, so as to perform an authorization operation between the user device and the service device.

Based on the above, the authorization method and the authorization system according to the embodiments of the disclosure can transmit the authorization information through the e-paper on the service device. The user device uses the authorization information displayed on the e-paper to perform the authorization operation between the user device and the service device. In this way, the authorization information provided by the service device can be prevented from being transmitted in the communication network (to prevent an illegal device from intercepting the authorization information from the communication network), thereby effectively improving information security of the authorization method and the authorization system.

To make the aforementioned and other features of the disclosure more comprehensible, several embodiments accompanied with drawings are described in detail as follows.

DETAILED DESCRIPTION OF DISCLOSED EMBODIMENTS

Figure 1:
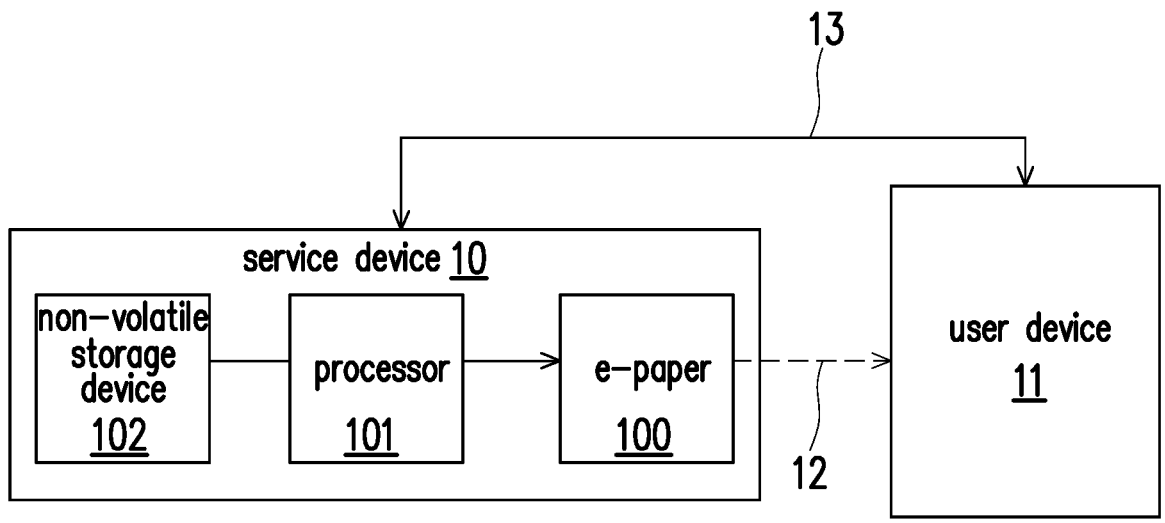
FIG. 1 is a circuit block diagram of an authorization system according to an embodiment of the disclosure.

Please refer to FIG. 1. FIG. 1 is a circuit block diagram of an authorization system 1 according to an embodiment of the disclosure. The authorization system 1 includes a service device 10 and a user device 11. The service device 10 includes an e-paper 100, a processor 101, and a non-volatile storage device 102. According to design requirements, in some embodiments, the service device 10 may include an embedded equipment and the e-paper 100 is arranged on the embedded equipment. The embedded equipment includes at least one of a router, a wireless access point equipment, and a server.

The non-volatile storage device 102 may store applications and/or data. According to design requirements, the non-volatile storage device 102 may include any type of storage device, such as a fixed storage device or a removable storage device. For example, in some embodiments, the non-volatile storage device 102 may include a read-only memory (ROM), a flash memory, a hard disk drive (HDD), a solid state drive (SSD), other storage device, or a combination of the above storage devices.

The processor 101 is coupled to the e-paper 100 and the non-volatile storage device 102. The processor 101 may access data stored in the non-volatile storage device 102. The processor 101 may be a hardware circuit implemented through a hardware description language (HDL) or other design method. According to design requirements, the processor 101 may include a field programmable gate array (FPGA), a complex programmable logic device (CPLD), or an application-specific integrated circuit (ASIC).

The processor 101 may also control the e-paper 100 to display the authorization information on the e-paper 100. The e-paper 100 is arranged on the service device 10. The e-paper 100 has a characteristic of low power consumption. After the power is turned off, the e-paper 100 may continuously display the authorization information and/or other information or graphics for a long time. The implementation detail of the e-paper 100 may be determined according to design requirements. For example, in some embodiments, the e-paper 100 may include an electrophoretic display (EPD), a cholesterol liquid crystal display (ChLCD), or other display. The e-paper 100 may include a single display or multiple displays according to different design requirements.

According to application requirements, the user device 11 may include a mobile station, an advanced mobile station (AMS), a server, a customer premise equipment (CPE), a desktop computer, a notebook computer, a network computer, a workstation, and a personal digital assistant (PDA), a personal computer (PC), a tablet, a scanner, a mobile device, a pager, a camera, a television, a handheld game console, etc. The user device 11 may obtain the authorization information from the e-paper 100 via a non-electrical channel 12.

For example, in some embodiments, the step of "obtaining the authorization information from the e-paper 100" includes: providing, by the user device 11, a user interface, wherein after the user visually reads the authorization information from the e-paper 100, the user may input the authorization information into the user interface of the user device 11. In other embodiments, the step of "obtaining the authorization information from the e-paper 100" includes: displaying, by the e-paper 100, the authorization information; capturing, by the user device 11, the authorization information displayed on the e-paper 100; and identifying (such as performing an image recognition or an optical character recognition), by the user device 11, the authorization information. In still other embodiments, the step of "obtaining authorization information from the e-paper 100" includes: displaying, by the e-paper 100, a barcode (such as a two-dimensional barcode) with the authorization information; capturing, by the user device 11, the barcode displayed on the e-paper 100; and obtaining, by the user device 11, the authorization information from the barcode.

The user device 11 may use the authorization information displayed on the e-paper 100 and perform an authorization operation between the user device 11 and the service device 10 through an electrical channel 13 (such as the Internet). According to application requirements, in some embodiments, the authorization operation includes at least one of a "system login operation", a "private key authorization operation", and a "communication connection establishment operation". For example, in an embodiment, the user device 11 may obtain a system service of the service device 10 after the authorization operation is successfully completed. Alternatively, the user device 11 may further establish a service with other device through the authorization of the service device 10. In other words, the user device 11 in the authorization system 1 may perform authorization with the service device 10 through the authorization method, thereby obtaining the service of the service device 10 (such as a router, a wireless access point equipment, and/or a server).

The service device 10 does not need to provide the authorization information to the user device 11 through the electrical channel 13 (such as the Internet). The user device 11 may obtain the authorization information from the e-paper 100 via the non-electrical channel 12. An illegal device cannot monitor the non-electrical channel 12, nor retrieve the authorization information from the non-electrical channel 12. Therefore, the authorization information provided by the service device 10 can be prevented from being intercepted, thereby effectively improving information security of the authorization system 1.

Figure 2:
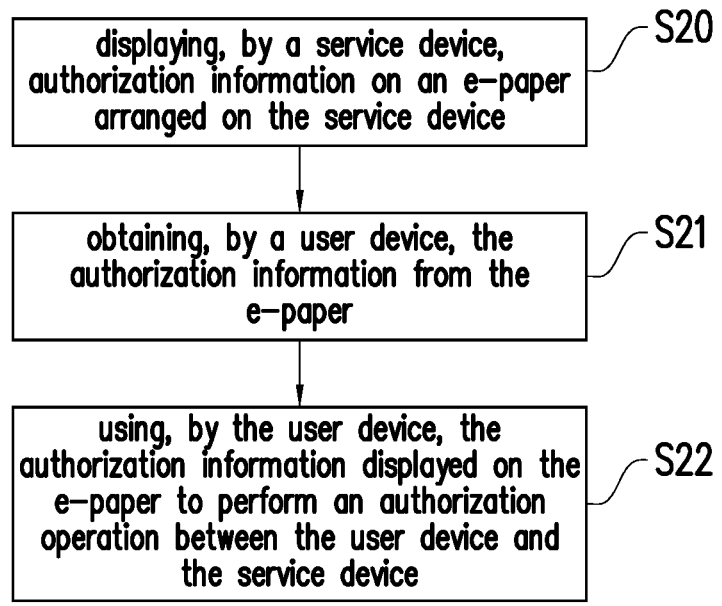
FIG. 2 is a flowchart of an authorization method according to an embodiment of the disclosure.

FIG. 2 is a flowchart of an authorization method according to an embodiment of the disclosure. The authorization method shown in FIG. 2 includes Steps S20 to S22 and may be executed by the authorization system 1 shown in FIG. 1. Please refer to FIG. 1 and FIG. 2. In Step S20, the processor 101 of the service device 10 displays the authorization information on the e-paper 100 arranged on the service device 10. The authorization information displayed on the e-paper 100 may be in various suitable data formats. For example, in some embodiments, the authorization information may include the user account (username), the password, and/or other information. The authorization information may be displayed on the e-paper 100 through text, graphics, or other suitable methods. When the authorization information is displayed in texts, the authorization information may be unencrypted (or encrypted) texts to record (or carry) the content of the authorization information. When the certification information is displayed in graphics, the graphic may include a one-dimensional barcode, a two-dimensional barcode, a graphic in a special coding format, and/or other graphic according to design requirements. The disclosure does not limit the format of the authorization information displayed on the e-paper 100.

In Step S21, the user device 11 may obtain the authorization information from the e-paper 100. The user device 11 may obtain the authorization information displayed on the e-paper 100 through a suitable method. For example, in the case where the authorization information includes text information, after the user visually reads the authorization information from the e-paper 100, the user may input the authorization information into the user interface provided by the user device 11, such that the user device 11 may obtain the authorization information displayed on the e-paper 100. In other embodiments, when the authorization information includes text information, graphic information, or a combination of the two, the user device 11 may capture the authorization information displayed on the e-paper 100, and then the user device 11 may identify the captured result (a photograph) to obtain the authorization information. In still other embodiments, Step S21 includes: displaying, by the e-paper 100, a barcode (such as a two-dimensional barcode) with the authorization information; capturing, by the user device 11, the barcode displayed on the e-paper 100; and obtaining, by the user device 11, the authorization information from the barcode.

In Step S22, the user device 11 may use the authorization information displayed on the e-paper 100 to perform an authorization operation between the user device 11 and the service device 10. The user device 11 may perform the authorization operation with the service device 10 according to the authorization information. For example, the authorization operation performed between the user device 11 and the service device 10 may include at least one of a "system login operation", a "private key authorization operation", and a "communication connection establishment operation".

In an embodiment, the authorization method shown in FIG. 2 may be applied to the "system login operation". That is, the user device 11 may use the user name and the password to log in to the service device 10 to set/control the service device 10. In Step S20, the processor 101 of the service device 10 displays the user name and the password (the authorization information) on the e-paper 100. In Step S21, the user device 11 may obtain the user name and the password (the authorization information) from the e-paper 100 through a suitable method. In Step S22, by using the user name and the password (the authorization information) displayed on the e-paper 100, the user device 11 may log in to the service device 10 to set/control the service device 10.

In another embodiment, the serving device 10 may include a wireless access point equipment. The service device 10 may provide a service set ID (SSID) and a password to the user device 11, such that the user device 11 may connect to the wireless network provided by the service device 10 (the communication connection establishment operation). In Step S20, the processor 101 of the service device 10 displays the SSID and the password (the authorization information) on the e-paper 100. In Step S21, the user device 11 may obtain the SSID and the password (the authorization information) from the e-paper 100 of the service device 10 through a suitable method. In Step S22, by using the SSID and the password (the authorization information) displayed on the e-paper 100, the user device 11 may connect to the wireless network provided by the service device 10, thereby obtaining the network service (the communication connection establishment operation).

In yet another embodiment, the authorization method shown in FIG. 2 may be applied to the authorization operation of wake on LAN (WOL). For example, the service device 10 may include a network attached storage (NAS) device connected to the electrical channel 13 (such as the Internet). Before the service device 10 enters the sleep state, the service device 10 may display the authorization information on the e-paper 100 arranged on the service device 10 (Step S20). The authorization information may include, for example, but not limited to, a MAC address, an IP address, a magic packet of the service device 10, and/or other content suitable for waking up the service device 10. In Step S21, the user device 11 may obtain the authorization information used to wake up the service device 10 from the e-paper 100 of the service device 10 through a suitable method. In Step S22, by using the authorization information displayed on the e-paper 100, the user device 11 may perform the authorization operation between the user device 11 and the service device 10 via the electrical channel 13 (such as the Internet) to wake up the service device 10.

In still another embodiment, the authorization method shown in FIG. 2 may be applied to the authorization operation of spatial positioning. In detail, in the embodiment, the service device 10 may be a server device and the service device 10 has the e-paper 100 disposed in a space. In Step S20, the service device 10 may display a single or multiple pieces of authorization information including map, road sign, or location information on the e-paper 100. In Step S21, the user device 11 may obtain the authorization information from the e-paper 100 through a suitable method. In Step S22, the user device 11 may select the authorization information according to requirements. By using the authorization information displayed on the e-paper 100, the user device 11 may perform the authorization operation with the service device 10 to obtain the corresponding location information. In detail, the indoor map displayed by the e-paper 100 may have, for example, but not limited to, landmark icon, graphic code, or text information, respectively corresponding to different places indoor. Therefore, in Step S22, the user device 11 may make an inquiry according to the position information displayed on the e-paper 100, thereby obtaining relevant information about the location of the user device 11.

Figure 3:
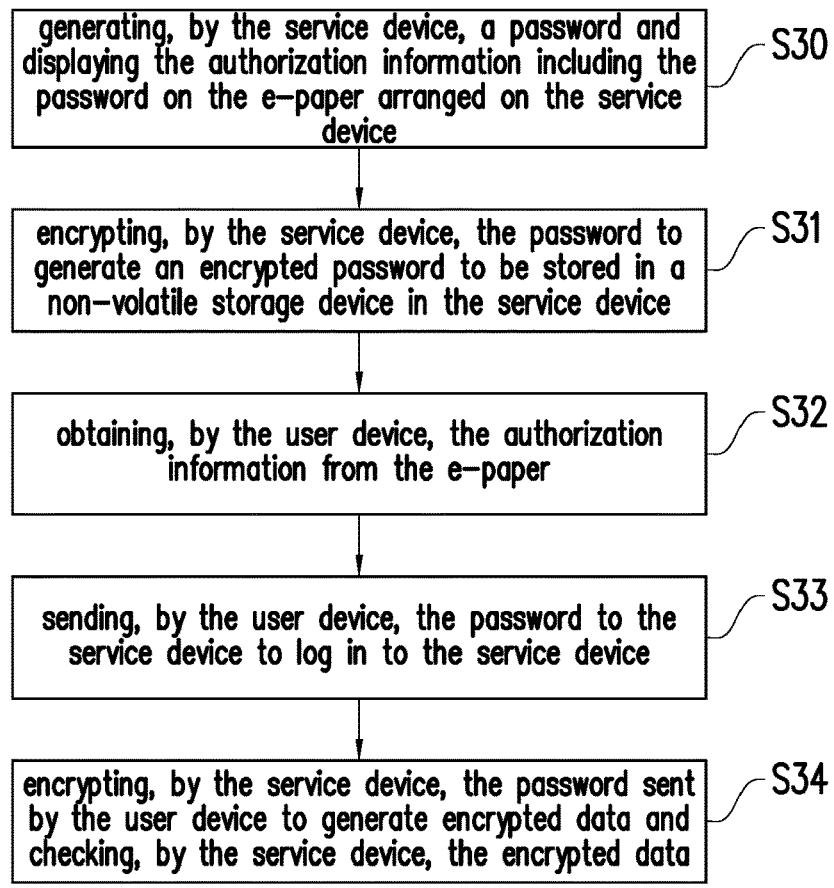
FIG. 3 is a flowchart of an authorization method according to another embodiment of the disclosure.

FIG. 3 is a flowchart of an authorization method according to another embodiment of the disclosure. The authorization method shown in FIG. 3 includes Steps S30 to S34. Please refer to FIG. 1 and FIG. 3. In Step S30, the processor 101 of the service device 10 may generate a password and display authorization information including the password on the e-paper 100 arranged on the service device 10, so as not to perform an authorization operation of changing the password without changing the original account (the original user name). Alternatively, in another embodiment, the processor 101 of the service device 10 may generate a new account (a new user name) and a new password in Step S30 to replace the original account and the original password, and display the authorization information including the new account and the new password on the e-paper 100 arranged on the service device 10. Based on design requirements and/or application requirements, in some application scenarios, the processor 101 may delete only the original password and keep the original account. In other application scenarios, the processor 101 may delete both the original account and the original password.

For example, if the system has only one account and is a superuser (an account with administrative authority), then the processor 101 does not have to change the original account and only the password is changed. In some embodiments, the system may have multiple accounts or the system allows the name of the superuser to be changed, then the processor 101 may create a new account and delete the original account in Step S30 or change the name of the superuser.

The method of "generating a password" in Step S30 may be formulated according to design requirements. For example, the processor 101 of the service device 10 may generate a new password in a pseudo-random manner or other suitable method. The new password (the authorization information) may be displayed on the e-paper 100 through text, graphics, or other suitable methods. In another embodiment, the processor 101 of the service device 10 may also generate a new account (authorization information) in Step S30. The method of Step S30 for generating the new account may be deduced by referring to the relevant description of "generating a password", so no reiteration will be made here. Step S30 shown in FIG. 3 may display the authorization information on the e-paper 100 by referring to the relevant description of Step S20 shown in FIG. 2, so no reiteration will be made here.

In Step S31, the processor 101 of the service device 10 encrypts the password (in plain text) to generate an encrypted password and stores the encrypted password in a non-volatile storage device 102. For example, the processor 101 may use a one-way encryption algorithm or other suitable encryption algorithm to encrypt the password (in plain text) generated in Step S30, so as to generate the encrypted password. In this way, even if the service device 10 is hacked by an illegal device and the encrypted password is leaked, the illegal device still cannot obtain the password (in plain text). In an embodiment, in order to strengthen the security of the authorization system 1, after the processor 101 displays the encrypted password on the e-paper 100, the processor 101 may clear temporary data of a register (not shown in FIG. 1) to completely clear any unencrypted password stored in the service device 10.

In Step S32, the user device 11 may obtain the authorization information (including the account number (the user name) and/or the password (in plain text)) from the e-paper 100. Please refer to the relevant description of Step S21 shown in FIG. 2 for Step S32 shown in FIG. 3, so no reiteration will be made here. Next, in Step S33, the user device 11 may send the account (the user name) and the password to the service device 10 via the electrical channel 13 (such as the Internet), so as to log in to the service device 10. Please refer to the relevant description of Step S22 shown in FIG. 2 for Steps S33 and S34 shown in FIG. 3.

In Step S34, the processor 101 of the service device 10 may encrypt the password sent by the user device 11 to perform authorization. In detail, the service device 10 may encrypt the password sent by the user device 11 in the same encryption method (encryption algorithm) as in Step S31 to generate encrypted data. The service device 10 may check the encrypted data in Step S34. The service device 10 may determine whether the encrypted data (the result after encrypting the password sent by the user device 11) is consistent with the encrypted password (the encrypted password stored in the non-volatile storage device 102). When the encrypted data is consistent with the encrypted password stored in the non-volatile storage device 102, the processor 101 determines a "successful login". Conversely, when the encrypted data is inconsistent with the encrypted password stored in the non-volatile storage device 102, the processor 101 determines a "login failure".

In short, the authorization method shown in FIG. 3 may prevent storing unencrypted passwords in the service device 10. In addition, the authorization information displayed on the e-paper 100 cannot be read by the service device 10, so even if the service device 10 is hacked, the user password can be protected from being leaked, thereby effectively improving information security of the authorization system 1.

Figure 4:
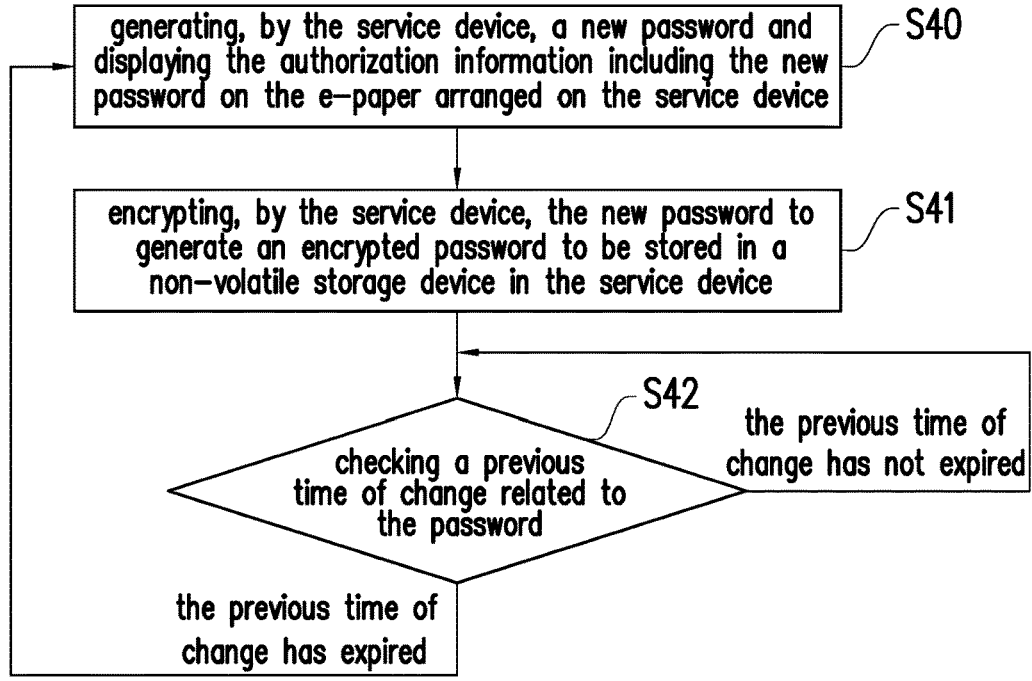
FIG. 4 is a flowchart of an authorization method according to another embodiment of the disclosure.

FIG. 4 is a flowchart of an authorization method according to another embodiment of the disclosure. The authorization system 1 may check whether a password in authorization information is periodically updated through the authorization method shown in FIG. 4 to strengthen information security of the authorization system 1. The authorization method shown in FIG. 4 includes Steps S40 to S42. Steps S40 and S41 in FIG. 4 are similar to Steps S30 and S31 in FIG. 3, so please refer to the relevant descriptions of Steps S30 and S31 shown in FIG. 3 for relevant content, which will not be reiterated here.

Please refer to FIG. 1 and FIG. 4. In Step S42, the processor 101 of the service device 10 may check the previous time of change of the password. In detail, the processor 101 may also record the time each time a new password is generated and store the time in the non-volatile storage device 102 as the "previous time of change". Therefore, the processor 101 may compare the current time with the previous time of change (the previous time when the service device 10 generated a new password) to obtain a time interval between the two. The processor 101 may further determine whether the time interval from the previous time of change to the current time is greater than a threshold. The threshold may be set according to design requirements and/or application requirements. When the time interval is less than or equal to the threshold (the determination result of Step S42 is "the previous time of change has not expired"), the processor 101 may repeat Step S42 to continuously monitor whether the password for authorization is periodically updated.

Conversely, when the time interval exceeds (is greater than) the threshold (the determination result of Step S42 is "the previous time of change has expired"), the processor 101 of the service device 10 may perform Step S40 again to update the password for authorization. In Step S40, the processor 101 of the service device 10 may generate a new password to replace the original password and display the new password on the e-paper 100 arranged on the service device 10. Alternatively, in Step S40, the processor 101 of the service device 10 may generate a new account and a new password to replace the original account and password, and display the new account and the new password on the e-paper 100 arranged on the service device 10. In this way, the service device 10 may periodically update the password for authorization of the user device 11 and display the updated authorization information on the e-paper 100, thereby effectively improving information security of the authorization system 1.

In addition, since the authorization information may include information other than the password, in Step S40, when the processor 101 of the service device 10 displays the new password on the e-paper 100 arranged on the service device 10, the display screen on the e-paper 100 may be updated through different methods. For example, when the e-paper 100 has multiple display screens, the service device 10 may update some or all of the displayed authorization information on the multiple display screens. Alternatively, in the case where the e-paper 100 has the function of partially updating the screens, the service device 100 may also update a specific area of the e-paper 100 displaying the password without updating other areas of the e-paper 100.

Of course, Steps S32 to S34 in FIG. 3 may also be applied to the authorization method shown in FIG. 4. In detail, after Step S41 is completed, the user device 11 may obtain the authorization information from the e-paper 100 (Step S32) and send the account and the password to the service device 10 via the electrical channel 13, so as to log in to the service device 10 (Step S33). The processor 101 of the service device 10 may encrypt the password sent by the user device 11 to generate encrypted data and check whether the encrypted data is consistent with the encrypted password stored in the non-volatile storage device 102 (Step S34).

Figure 5:
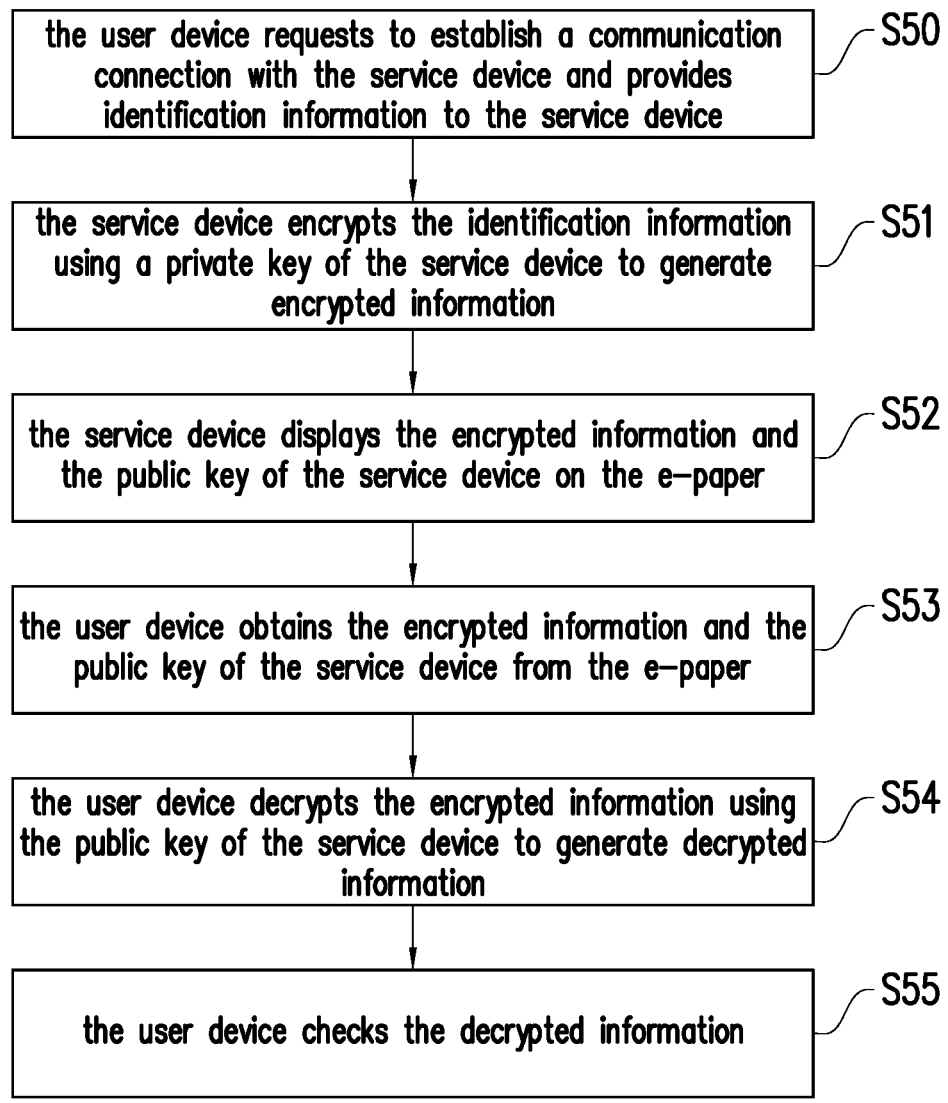
FIG. 5 is a flowchart of an authorization method according to another embodiment of the disclosure.

FIG. 5 is a flowchart of an authorization method according to another embodiment of the disclosure. FIG. 5 includes Steps S50 to S55. Generally speaking, the authorization method shown in FIG. 5 may display authorization information on the e-paper 100 through the service device 10, such that the user device 11 may check whether the service device 10 is a legitimate device. The embodiment shown in FIG. 5 will perform an authorization operation using an asymmetric encryption algorithm.

Please refer to FIG. 1 and FIG. 5. In Step S50, the user device 11 may request the processor 101 of the service device 10 to establish a communication connection and provide identification information to the service device 10. According to design requirements, in some embodiments, the identification information provided by the user device 11 may be identification information relevant to the user device 11. For example, the identification information relevant to the user device 11 may include, for example, but not limited to, the model of the user device 11, the subscriber identity module (SIM) card data, the network address, the time stamp of the request sent by the user device 11, the positioning location of the user device 11, or other information relevant to the user device 11. In other embodiments, the identification information provided by the user device 11 may be any data or value. For example, the identification information provided by the user device 11 may include a pseudo-random value or any other data or value irrelevant to the user device 11. After the identification information is provided to the service device 10, the user device 11 still retains the identification information for use in Step S55.

In Step S51, the processor 101 of the service device 10 encrypts the identification information provided by the user device 11 with a private key of the service device 10 to generate encrypted information. In detail, the processor 101 of the service device 10 may generate a public key and a private key corresponding to each other by using an asymmetric encryption algorithm and encrypt the identification information provided by the user device 11 using the private key.

In Step S52, the processor 101 of the service device 10 may display the authorization information on the e-paper 100. In the embodiment, the authorization information displayed on the e-paper 100 may include the encrypted information and the public key of the service device 10. Step S52 shown in FIG. 5 may display the authorization information on the e-paper 100 by referring to the relevant description of Step S20 shown in FIG. 2, so no reiteration will be made here.

In Step S53, the user device 11 may obtain the authorization information (including the encrypted information and the public key of the service device 10) from the e-paper 100. Please refer to the relevant description of Step S21 shown in FIG. 2 for Step S53 shown in FIG. 5, such that the user device 11 may obtain the authorization information displayed on the e-paper 100 through a suitable method, so the detail of Step S53 will not be reiterated here.

In Step S54, the user device 11 may use the public key of the service device 10 to decrypt the encrypted information, so as to generate decrypted information. Since the encrypted information is generated by the service device 10 encrypting the private key, the user device 11 should be able to correctly decrypt the encrypted information using the public key of the service device 10.

In Step S55, the user device 11 may check the decrypted information. As the description relevant to Step S50, after the identification information is provided to the service device 10, the user device 11 still keeps the identification information. When the decrypted information (the decryption result of the encrypted information) is consistent with the identification information, the user device 11 may be determined as a "successful authorization" (that is, the service device 10 is a legitimate device). Conversely, when the decrypted information (the decryption result of the encrypted information) is inconsistent with the identification information, the user device 11 may be determined as an "authorization failure" (that is, the service device 10 is an illegal device).

In short, in the authorization method shown in FIG. 5, the user device 11 may determine whether the public key is correct by decrypting the encrypted information of the user device 11 through the public key of the service device 10 (the private key authorization operation). The e-paper 100 of the service device 10 provides the public key of the service device 10 and the encrypted information to the user device 11 through the non-electrical channel 12. The authorization method shown in FIG. 5 can prevent the hacker from stealing the information of the user device 11 with the authorization interface of phishing websites. In addition, the non-electrical channel 12 provided by the e-paper 100 can also prevent the public key of the service device 10 from being stolen during the process of network transmission. Therefore, the authorization method shown in FIG. 5 can effectively prevent phishing websites from stealing data or the authorization information from leaking, thereby effectively improving information security of the authorization system 1.

Figure 6:
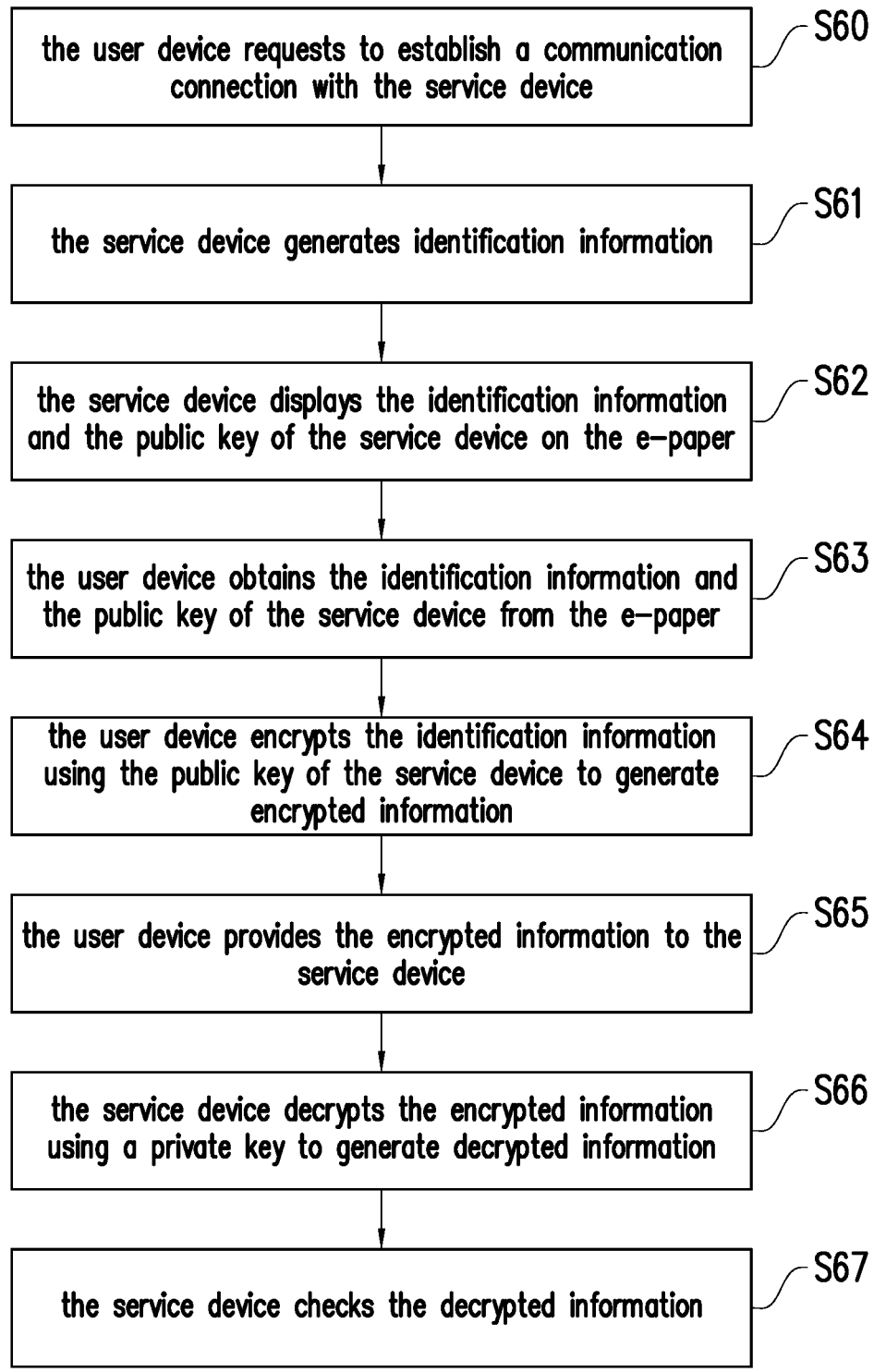
FIG. 6 is a flowchart of an authorization method according to another embodiment of the disclosure.

FIG. 6 is a flowchart of an authorization method according to another embodiment of the disclosure. The authorization method shown in FIG. 6 includes Steps S60 to S67. Generally speaking, the authorization method shown in FIG. 6 may display the authorization information on the e-paper 100 through the service device 10, such that the user device 11 may reply to the service device 10 according to the authorization information. The service device 10 may check whether the user device 11 is a legitimate device according to the reply content of the user device 11. The embodiment shown in FIG. 6 will perform an authorization operation using an asymmetric encryption algorithm.

Please refer to FIG. 1 and FIG. 6. In Step S60, the user device 11 may request the processor 101 of the service device 10 to establish a communication connection. In response to the request of the user device 11, in Step S61, the processor 101 of the service device 10 may generate identification information. According to design requirements, in some embodiments, the identification information provided by the service device 10 may be identification information relevant to the service device 10. For example, the identification information relevant to the service device 10 may include, for example, but not limited to, the system message, the system name, the system time, the network address of the system, etc. of the service device 10, or other information relevant the service device 10. In other embodiments, the identification information provided by the service device 10 may be any data or value. For example, the identification information provided by the service device 10 may include a pseudo-random value or any other data or value irrelevant to the service device 10. The service device 10 may keep the identification information for use in Step S67.

In Step S62, the processor 101 of the service device 10 may display the authorization information on the e-paper 100. In the embodiment, the authorization information displayed on the e-paper 100 includes the identification information and the public key of the service device 10. Step S62 shown in FIG. 6 may display the authorization information on the e-paper 100 by referring to the relevant description of Step S20 shown in FIG. 2. In detail, the processor 101 of the service device 10 may generate a public key and a private key corresponding to each other by using an asymmetric encryption algorithm, and display the public key and the identification information on the e-paper 100.

In Step S63, the user device 11 may obtain the authorization information (including the identification information and the public key of the service device 10) from the e-paper 100. Please refer to the relevant description of Step S21 shown in FIG. 2 for Step S63 shown in FIG. 6, such that the user device 11 may obtain the authorization information displayed on the e-paper 100 through a suitable method, so the detail of Step S63 will not be reiterated here.

In Step S64, the user device 11 may use the public key of the service device 10 to encrypt the identification information, so as to generate encrypted information. In Step S65, the user device 11 may provide encrypted information to the processor 101 of the service device 10 through the electrical channel 13 (such as the Internet, the local area network, and/or other network) for authorization. Since the public key of the service device 10 is transmitted to the user device 11 through the non-electrical channel 12, the public key information of the service device 10 is secure. The user device 11 encrypts the identification information provided by the service device 10 using the public key of the service device 10, so as to generate an encrypted information unforgeable by the hacker.

In Step S66, the processor 101 of the service device 10 may use the private key of the service device 10 to decrypt the encrypted information, so as to generate decrypted information. Since the encrypted information is generated by the user device 11 encrypting the public key of the service device 10, the service device 10 should correctly decrypt the encrypted information using the private key of the service device 10.

In Step S67, the processor 101 of the service device 10 may check the decrypted information. As the description relevant to Step S61, the service device 10 keeps the identification information for use in Step S67. When the decrypted information (the decryption result of the encrypted information) is consistent with the identification information, the processor 101 may determine a "successful authorization" (that is, the user device 11 is a legitimate device). Conversely, when the decrypted information (the decryption result of the encrypted information) is inconsistent with the identification information, the processor 101 may determine a "authorization failure" (that is, the user device 11 is an illegal device).

In short, in the authorization method shown in FIG. 6, the user device 11 may encrypt the identification information provided by the service device 10 through the public key of the service device 10 and return the encryption result (the encrypted information) to the service device 10. The service device 10 decrypts the encrypted information to determine whether the user device 11 is a legitimate device. The e-paper 100 of the service device 10 provides the authorization information (the identification information and the public key of the service device 10) to the user device 11 through the non-electrical channel 12. The authorization method shown in FIG. 6 can effectively prevent the hacker from intercepting the public key and forging the public key. Therefore, the authorization method shown in FIG. 6 can effectively improve information security of the authorization system 1.

Figure 7:
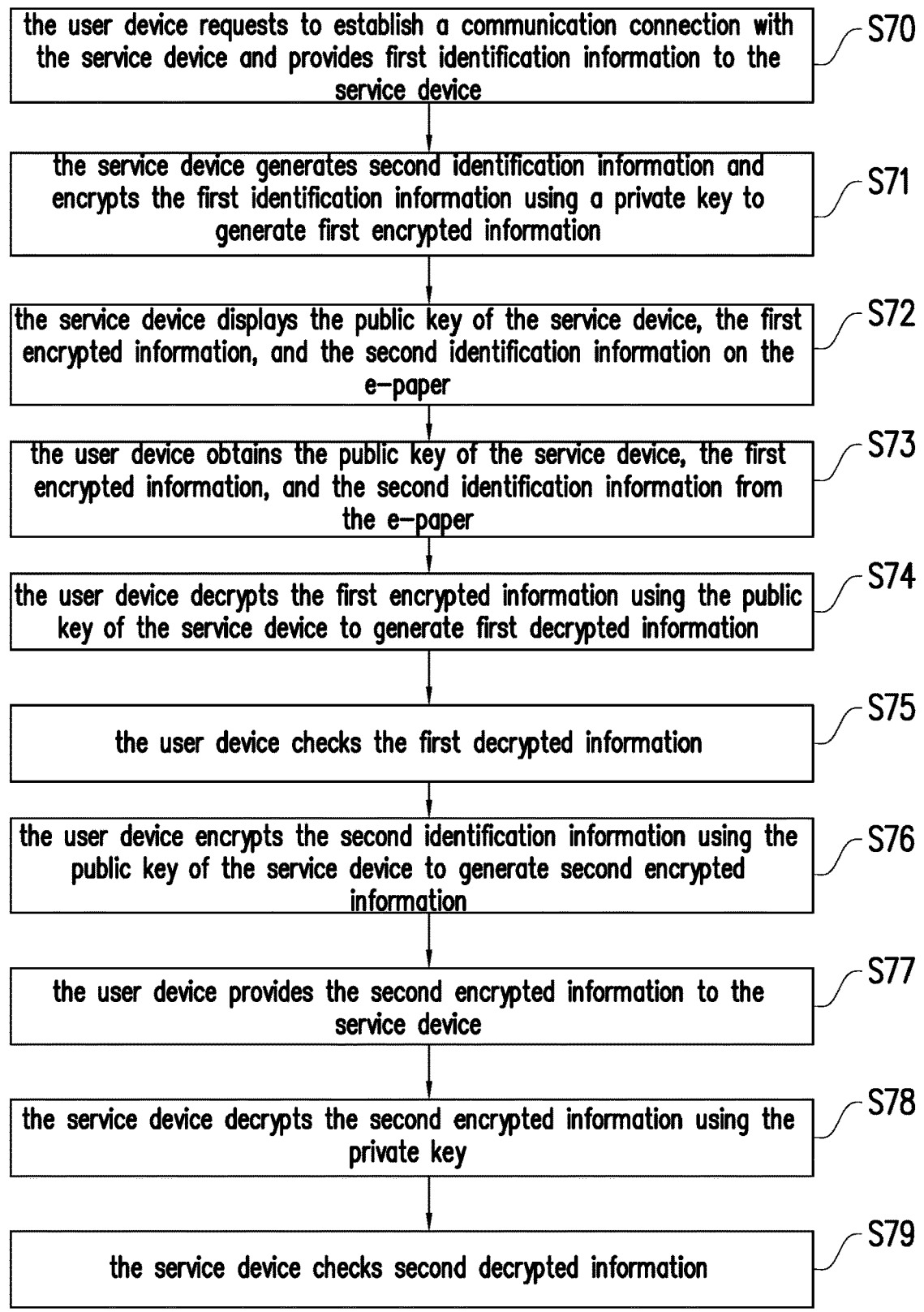
FIG. 7 is a flowchart of an authorization method according to another embodiment of the disclosure.

FIG. 7 is a flowchart of an authorization method according to another embodiment of the disclosure. The authorization method shown in FIG. 7 includes Steps S70 to S79. Generally speaking, the authorization method shown in FIG. 7 may perform two-way authorization between the user device 11 and the service device 10. That is, based on the authorization information displayed by the e-paper 100 of the service device 10, the user device 11 may check whether the service device 10 is a legitimate device and the service device 10 may also check whether the user device 11 is a legitimate device.

Please refer to FIG. 1 and FIG. 7. In Step S70, the user device 11 may request the processor 101 of the service device 10 to establish a communication connection and provide first identification information to the service device 10. Please refer to the relevant description of Step S50 shown in FIG. 5 for Step S70 shown in FIG. 7 and refer to the relevant description of the identification information described in Step S50 for the first identification information of Step S70, so no reiteration will be made here. After the first identification information is provided to the service device 10, the user device 11 still keeps the first identification information for use in Step S75.

In Step S71, the processor 101 of the service device 10 may use the private key of the service device 10 to encrypt the first identification information provided by the user device 11 to generate first encrypted information. The processor 101 of the service device 10 may also generate second identification information in Step S71. The service device 10 may keep the second identification information for use in Step S79. Please refer to the relevant description of Step S51 shown in FIG. 5 and/or Step S61 shown in FIG. 6 for Step S71 shown in FIG. 7, refer to the relevant descriptions of the identification information and the encrypted information described in Step S51 for the first identification information and the first encrypted information of Step S71, and refer to the relevant description of the identification information described in Step S61 for the second identification information of Step S71, so no reiteration will be made here.

In Step S72, the processor 101 of the service device 10 may display the authorization information on the e-paper 100. In the embodiment, the authorization information displayed on the e-paper 100 may include the public key of the service device 10, the first encrypted information, and the second identification information. Please refer to the relevant description of Step S52 shown in FIG. 5 and/or Step S62 shown in FIG. 6 for Step S72 shown in FIG. 7, refer to the relevant description of the encrypted information described in Step S52 for the first encrypted information of Step S72, and refer to the relevant description of the identification information described in Step S62 for the second identification information of Step S72, so no reiteration will be made here.

In Step S73, the user device 11 may obtain the authorization information (including the first encrypted information, the second identification information, and the public key of the service device 10) from the e-paper 100. Please refer to the relevant description of Step S21 shown in FIG. 2 for Step S73 shown in FIG. 7, such that the user device 11 may obtain the authorization information displayed on the e-paper 100 through a suitable method. Please refer to the relevant description of Step S53 shown in FIG. 5 and/or Step S63 shown in FIG. 6 for Step S73 shown in FIG. 7, refer to the relevant description of the encrypted information described in Step S53 for the first encrypted information of Step S73, and refer to the relevant description of the identification information described in Step S63 for the second identification information of Step S73, so no reiteration will be made here.

In Step S74, the user device 11 may use the public key of the service device 10 to decrypt the first encrypted information, so as to generate first decrypted information. Please refer to the relevant description of Step S54 shown in FIG. 5 for Step S74 shown in FIG. 7 and refer to the relevant descriptions of the encrypted information and the decrypted information described in Step S54 for the first encrypted information and the first decrypted information of Step S74, so no reiteration will be made here.

In Step S75, the user device 11 may check the first decrypted information. After the first identification information is provided to the service device 10 in Step S70, the user device 11 still keeps the first identification information. When the first decrypted information (the decryption result of the first encrypted information) is consistent with the first identification information, the user device 11 may be determined as a "successful authorization" (that is, the user device 11 determines that the service device 10 is a legitimate device). Conversely, when the first decrypted information (the decryption result of the first encrypted information) is inconsistent with the first identification information, the user device 11 may be determined as an "authorization failure" (that is, the user device 11 determines that the service device 10 is an illegal device). Please refer to the relevant description of Step S55 shown in FIG. 5 for Step S75 shown in FIG. 7 and refer to the relevant descriptions of the identification information and the decrypted information described in Step S55 for the first identification information and the first decrypted information of Step S75, so no reiteration will be made here.

In Step S76, the user device 11 may use the public key of the service device 10 to encrypt the second identification information to generate second encrypted information. Please refer to the relevant description of Step S64 shown in FIG. 6 for Step S76 shown in FIG. 7 and refer to the relevant descriptions of the identification information and the encrypted information described in Step S64 for the second identification information and the second encrypted information of Step S76, so no reiteration will be made here.

In Step S77, the user device 11 may provide the second encrypted information to the processor 101 of the service device 10 through the electrical channel 13 (such as the Internet, the local area network, and/or other network) for authorization. Please refer to the relevant description of Step S65 shown in FIG. 6 for Step S77 shown in FIG. 7 and refer to the relevant description of the encrypted information described in Step S65 for the second encrypted information of Step S77, so no reiteration will be made here.

In Step S78, the processor 101 of the service device 10 may use the private key of the service device 10 to decrypt the second encrypted information to generate second decrypted information. Please refer to the relevant description of Step S66 shown in FIG. 6 for Step S78 shown in FIG. 7 and refer to the relevant descriptions of the encrypted information and the decrypted information described in Step S66 for the second encrypted information and the second decrypted information of Step S78, so no reiteration will be made here.

In Step S79, the processor 101 of the service device 10 may check the second decrypted information. As the description relevant to Step S71, the service device 10 keeps the second identification information for use in Step S79. When the second decrypted information (the decryption result of the second encrypted information) is consistent with the second identification information, the processor 101 may determine a "successful authorization" (that is, the service device 10 determines that the user device 11 is a legitimate device). Conversely, when the second decrypted information (the decryption result of the second encrypted information) is inconsistent with the second identification information, the processor 101 may determine a "authorization failure" (that is, the service device 10 determines that the user device 11 is an illegal device). Please refer to the relevant description of Step S67 shown in FIG. 6 for Step S79 shown in FIG. 7 and refer to the relevant descriptions of the decrypted information and the identification information described in Step S67 for the second decrypted information and the second identification information of Step S79, so no reiteration will be made here.

In this way, in the case where both the service device 10 and the user device 11 are successfully authorized, the communication connection between the service device 10 and the user device 11 may be successfully established.

In summary, based on the authorization method according to the embodiments, the service device 10 of the authorization system 1 may use the non-electrical channel 12 provided by the e-paper 100 to replace the electrical channel 13 (such as the Internet, the local area network, and/or other network), so as to transmit the authorization information. Using the authorization information provided by the e-paper 100, the user device 11 may perform the authorization operation. Providing (transmitting) the authorization information through the e-paper can effectively prevent the authorization information from being illegally intercepted. Therefore, the authorization method and the authorization system 1 according to the embodiments can effectively improve information security.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An authorization method, comprising:
    displaying, by a service device, authorization information on an e-paper arranged on the service device;
    clearing, by the service device, temporary data of a register of the service device after displaying the authorization information on the e-paper;
    obtaining, by a user device, the authorization information from the e-paper; and
    using, by the user device, the authorization information displayed on the e-paper to perform an authorization operation between the user device and the service device,
    wherein the authorization information displayed on the e-paper cannot be read by the service device,
    wherein the authorization information comprises a public key of the service device, the authorization method further comprising:
    requesting, by the user device, to establish a communication connection with the service device, and providing identification information to the service device;
    encrypting, by the service device, the identification information using a private key of the service device to generate encrypted information; and
    displaying, by the service device, the public key and the encrypted information on the e-paper.

2. The authorization method according to claim 1, wherein the service device comprises an embedded equipment and the e-paper is arranged on the embedded equipment.

3. The authorization method according to claim 2, wherein the embedded equipment comprises at least one of a router, a wireless access point equipment, and a server.

4. The authorization method according to claim 1, wherein the e-paper comprises an electrophoretic display.

5. The authorization method according to claim 1, wherein the authorization operation comprises at least one of a system login operation, a private key authorization operation, and a communication connection establishment operation.

6. The authorization method according to claim 1, wherein the step of "obtaining the authorization information from the e-paper" comprises:
providing, by the user device, a user interface, wherein after a user visually reads the authorization information from the e-paper, the user inputs the authorization information into the user interface.

7. The authorization method according to claim 1, wherein the step of "obtaining the authorization information from the e-paper" comprises:
displaying, by the e-paper, the authorization information;
capturing, by the user device, the authorization information displayed on the e-paper; and
identifying, by the user device, the authorization information.

8. The authorization method according to claim 1, wherein the step of "obtaining the authorization information from the e-paper" comprises:
displaying, by the e-paper, a barcode with the authorization information;
capturing, by the user device, the barcode displayed on the e-paper; and
obtaining, by the user device, the authorization information from the barcode.

9. The authorization method according to claim 1, further comprising:
generating, by the service device, a password, wherein the authorization information comprises the password;
displaying the password on the e-paper arranged on the service device;
encrypting, by the service device, the password to generate an encrypted password; and
storing, by the service device, the encrypted password in a non-volatile storage device in the service device.

10. The authorization method according to claim 9, wherein the service device generates the password in a pseudo-random manner.

11. The authorization method according to claim 9, wherein the authorization operation comprises:
obtaining, by the user device, the password from the e-paper;
sending, by the user device, the password to the service device to log in to the service device;
encrypting, by the service device, the password sent by the user device to generate encrypted data;
checking, by the service device, the encrypted data; and
determining, by the service device, a "login failure" when the encrypted data is inconsistent with the encrypted password stored in the non-volatile storage device.

12. The authorization method according to claim 9, further comprising:
generating, by the service device, a new account is to replace an original account of the service device, wherein the authorization information comprises the new account.

13. The authorization method according to claim 9, further comprising:
checking a previous time of change related to the password;
generating, by the service device, a new password is to replace the password when a time interval from the previous time of change to a current time exceeds a threshold, and displaying the new password on the e-paper arranged on the service device.

14. The authorization method according to claim 1, wherein the authorization operation comprises:
obtaining, by the user device, the public key and the encrypted information from the e-paper;
decrypting, by the user device, the encrypted information using the public key to generate decrypted information;
checking, by the user device, the decrypted information; and
determining, by the user device, an "authorization failure" when the decrypted information is inconsistent with the identification information.

15. The authorization method according to claim 1, wherein the authorization information comprises a public key of the service device, the authorization method further comprising:
requesting, by the user device, to establish a communication connection with the service device;
generating, by the service device, identification information, wherein the authorization information comprises the identification information; and
displaying, by the service device, the public key and the identification information on the e-paper.

16. The authorization method according to claim 15, wherein the authorization operation comprises:
obtaining, by the user device, the public key and the identification information from the e-paper;
encrypting, by the user device, the identification information using the public key to generate encrypted information;
providing, by the user device, the encrypted information to the service device;
decrypting, by the service device, the encrypted information using a private key of the service device to generate decrypted information;
checking, by the service device, the decrypted information; and
determining, by the service device, an "authorization failure" when the decrypted information is inconsistent with the identification information.

17. An authorization system, comprising:
a service device, comprising an e-paper, a register and a processor, wherein the processor is configured to control the e-paper, so as to display authorization information on the e-paper; and
a user device, configured to obtain the authorization information from the e-paper and use the authorization information displayed on the e-paper to perform an authorization operation between the user device and the service device,
wherein the processor is further configured to clear temporary data of the register of the service device after displaying the authorization information on the e-paper,
wherein the authorization information displayed on the e-paper cannot be read by the service device,
wherein the authorization information comprises a public key of the service device,
the user device requests to establish a communication connection with the service device and provides identification information to the service device, the processor encrypts the identification information using a private key of the service device to generate encrypted information, and the processor displays the public key and the encrypted information on the e-paper of the service device.

18. The authorization system according to claim 17, wherein the service device comprises an embedded equipment and the e-paper is arranged on the embedded equipment.

19. The authorization system according to claim 18, wherein the embedded equipment comprises at least one of a router, a wireless access point equipment, and a server.

20. The authorization system according to claim 17, wherein the e-paper comprises an electrophoretic display.

21. The authorization system according to claim 17, wherein the authorization operation comprises at least one of a system login operation, a private key authorization operation, and a communication connection establishment operation.

22. The authorization system according to claim 17, wherein the step of "obtaining the authorization information from the e-paper" comprises:

providing, by the user device, a user interface, wherein after a user visually reads the authorization information from the e-paper, the user inputs the authorization information into the user interface.

23. The authorization system according to claim 17, wherein the step of "obtaining the authorization information from the e-paper" comprises:

displaying, by the e-paper, the authorization information;

capturing, by the user device, the authorization information displayed on the e-paper; and identifying, by the user device, the authorization information.

24. The authorization system according to claim 17, wherein the step of "obtaining the authorization information from the e-paper" comprises:

displaying, by the e-paper, a barcode with the authorization information;

capturing, by the user device, the barcode displayed on the e-paper; and obtaining, by the user device, the authorization information from the barcode.

25. The authorization system according to in claim 17, wherein the service device further includes a non-volatile storage device, the processor generates a password, the authorization information comprises the password, the processor displays the password on the e-paper arranged on the service device, the processor encrypts the password to generate an encrypted password, and the processor stores the encrypted password in the non-volatile storage device in the service device.

26. The authorization system according to claim 25, wherein the processor generates the password in a pseudo-random manner.

27. The authorization system according to claim 25, wherein the authorization operation comprises:

obtaining, by the user device, the password from the e-paper;

sending, by the user device, the password to the service device to log in to the service device;

encrypting, by the processor, the password sent by the user device to generate encrypted data;

checking, by the processor, the encrypted data; and determining, by the processor, a "login failure" when the encrypted data is inconsistent with the encrypted password stored in the non-volatile storage device.

28. The authorization system according to claim 25, wherein the processor generates a new account to replace an original account of the service device and the authorization information comprises the new account.

29. The authorization system according to claim 25, wherein the processor checks a previous time of change related to the password and when a time interval from the previous time of change to a current time exceeds a threshold, the processor generates a new password to replace the password and displays the new password on the e-paper arranged on the service device.

30. The authorization system according to claim 18, wherein the authorization operation comprises:

the user device obtaining the public key and the encrypted information from the e-paper;

the user device decrypting the encrypted information using the public key to generate decrypted information;

the user device checking the decrypted information; and the user device determining an "authorization failure" when the decrypted information is inconsistent with the identification information.

31. The authorization system according to claim 17, wherein the authorization information comprises a public key of the service device, the user device requests to establish a communication connection with the service device;

the processor generates identification information, wherein the authorization information comprises the identification information, and the processor displays the public key and the identification information on the e-paper.

32. The authorization system according to claim 31, wherein the authorization operation comprises:

the user device obtaining the public key and the identification information from the e-paper;

the user device encrypting the identification information using the public key to generate encrypted information;

the user device providing the encrypted information to the service device for authorization;

the processor decrypting the encrypted information using a private key of the service device to generate decrypted information;

the processor checking the decrypted information; and the processor determining an "authorization failure" when the decrypted information is inconsistent with the identification information.

* * * * *